United States Patent
deVry

(10) Patent No.: US 7,875,656 B2
(45) Date of Patent: Jan. 25, 2011

(54) FOAMABLE SEALANT COMPOSITION

(75) Inventor: William Edward deVry, Malvern, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1085 days.

(21) Appl. No.: 11/280,567

(22) Filed: Nov. 16, 2005

(65) Prior Publication Data

US 2006/0135635 A1 Jun. 22, 2006

Related U.S. Application Data

(60) Provisional application No. 60/639,049, filed on Dec. 22, 2004.

(51) Int. Cl.
*C08J 9/06* (2006.01)
*C08J 9/12* (2006.01)
(52) U.S. Cl. .......................................... 521/82; 521/93
(58) Field of Classification Search .................... 521/82
See application file for complete search history.

(56) References Cited

U.S. PATENT DOCUMENTS

| | | | |
|---|---|---|---|
| 4,814,373 A | | 3/1989 | Frankel et al. |
| 5,360,826 A | * | 11/1994 | Egolf et al. .................... 521/54 |
| 5,382,397 A | | 1/1995 | Turner, Jr. |
| 2003/0032351 A1 | * | 2/2003 | Horner et al. .................. 442/76 |
| 2004/0033362 A1 | | 2/2004 | Mino |

FOREIGN PATENT DOCUMENTS

| | | |
|---|---|---|
| EP | 0 031 531 A | 7/1981 |
| JP | 06-073260 A | 3/1994 |
| JP | 08-333846 A | 12/1996 |

* cited by examiner

*Primary Examiner*—Mark Eashoo
*Assistant Examiner*—Peter F Godenschwager
(74) *Attorney, Agent, or Firm*—Andrew E C Merriam

(57) ABSTRACT

A foamable sealant composition having a density, when foamed, of from 0.4 to 1.8 g/cc, and containing a latex binder, foam-generating composition, foam stabilizer, rheology modifier and water, is provided. Also provided is a method of sealing a vehicle using the foamable sealant composition.

12 Claims, No Drawings

FOAMABLE SEALANT COMPOSITION

This is a non-provisional application of U.S. Provisional Application Ser. No. 60/639,049 filed on Dec. 22, 2004.

This invention relates to an aqueous foamable sealant composition that is particularly suitable, among other things, for motor vehicle sealant and sound-deadening applications. The invention also relates to a method of sealing a vehicle with the foamable sealant composition.

In motor vehicle manufacture, various polymeric sealants have been used to provide seals against wind and water penetration, among other things. Sealing the vehicle against wind is desirable for the prevention of the entrance of dust and dirt into the vehicle, and the reduction of wind noise; while sealing against water is desirable for the prevention of corrosion, and the inhibition of the growth of odor-causing mold, during the useful life of the vehicle. Sealants have typically been employed in motor vehicle self-sealing tires, water shields, doors, engine components, weather strips, threaded pipe fittings, air conditioners and heaters, tail lights, undercoatings of wheel wells and other areas, as body-seam sealers, for glazing, bonding and sealing windshields and back-lights, and in numerous other automotive applications.

Motor vehicle sealants should satisfy as many performance requirements as possible, including, for example, excellent metal, glass, and plastic adhesion, high cured modulus, high elongation/flexibility, good aging characteristics, good adhesion to oily substrates, chemical resistance including alkali and phosphate, and good water resistance, among other things.

Conventional automotive sealants include polymeric sealants that have been made in the form of a rope or pre-made beads, which may be placed in position in the vehicle by hand. This is disadvantageous in that it is labor intensive, as well as susceptible to human error. To avoid the problems associated with manual installation of automotive sealants, some vehicle manufacturers have employed curable, semi-liquid compositions that can be applied accurately by robotic arms. These must have good pumpable viscosities, and be curable to provide a sealant having the requirements noted herein-above. High molecular weight polyvinyl chloride (PVC) plastisols have been the predominant sealant used for motor vehicle applications. A problem associated with such plastisols is that they generate hydrogen chloride gas, and possibly other toxic byproducts such as dioxins, chlorine gas, and chlorinated hydrocarbons, upon exposure to the high temperatures employed during recycling or disposal. An additional problem associated with the plastisols is that they contain high levels of plasticizer. Some of the plasticizer is emitted from the sealant during application, and fusion of the plastisol during baking, and tends to continue to exude over time, resulting in an embrittled sealant, and posing problems with volatile organic compounds that can create air quality issues in motor vehicle manufacturing facilities and in the motor vehicle itself. Further, the presence of such non-reactive plasticizers presents problems with long term heat aging properties. These same problems associated with use of plasticizer are encountered when motor vehicle manufacturers employ high molecular weight elastomers, which require significant levels of plasticizers to obtain the necessary low final viscosity suitable for pumping. Examples of elastomers conventionally used by vehicle manufacturers include styrene butadiene, urethanes, and non-cured ethyl vinyl acetate copolymers.

Some have suggested that the problems created by high plasticizer levels can be overcome by formulating sealants with liquid low molecular weight elastomers which do not require plasticizers to achieve pumpable viscosities. However, this approach is costly because the low molecular weight liquids typically used, such as urethanes, silicones and epoxies, tend to be expensive. In addition to their cost, such substances also have short pot lives. Thus, there is a finite time period during which mixtures containing such substances can be worked.

U.S. Pat. No. 5,382,397 (Turner) discloses a method of sealing automotive body seams by introducing a gas, under pressure, into a high viscosity liquid polymer sealant, mixing, dispensing the polymer/gas solution downstream of the mixer in such a way as to avoid premature foaming of the polymer inside the mixer before it is released from the mixer at atmospheric pressure, forming closed cell foam beads upon deposition of the polymer sealant into an automotive seam, and curing the polymer sealant. However, Turner does not disclose a foamable sealant composition containing an acrylic latex binder having a Tg of from −35° C. to 35° C., a profoamant surfactant, a stabilizing surfactant, a rheology modifier, and water. Further, Turner does not disclose a foamed sealant having a density of from 0.4 to 1.8 g/cc.

Applicants have unexpectedly discovered a pumpable, foamable aqueous sealant that has the appropriate properties, among other things, for motor vehicle applications, and can reduce, if not eliminate, the need for high levels of low molecular weight volatile organic compounds, including, but not limited to plasticizers.

The first aspect of the invention provides a foamable sealant formulation, comprising: (a) a latex binder composition comprising, as polymerized units at least one acrylic or methacrylic monomer, wherein said binder has a Tg from −35 to 35° C.; (b) a foam-generating composition selected from the group consisting of a profoamant surfactant comprising an anionic or nonionic surfactant having a hydrophilic-lipophilic balance of from 8 to 20, and a blowing agent; (c) a foam stabilizer; (d) a rheology modifier; and (e) water; wherein the sealant, when foamed has a density of from 0.4 to 1.8 g/cc.

A second aspect of the invention provides a method for sealing a vehicle, comprising the steps of (1) providing the foamable sealant formulation of the first aspect, (2) foaming said sealant formulation to a density of from 0.4 to 1.8 g/cc to form a foamed sealant; (3) applying said foamed sealant to a motor vehicle; and curing said foamed sealant.

The composition of the present invention is a foamable sealant formulation containing a latex binder, a foam-generating composition, a foam stabilizer, a rheology modifier, and water. By "sealant" is meant herein, a material suitable for filling a space such that it at least partially, or completely prevents seepage, into, and/or around that space, of at least one of moisture, liquids, gases, particulate solids, and the like.

The latex binder contains as polymerized units, at least one acrylic or methacrylic monomer, or a combination thereof. Preferably, the latex binder contains as polymerized units at least 50 wt %, more preferably at least 75 wt %, of the acrylic or methacrylic monomer. Suitable latex binders are well known. Examples of suitable latex binders that are commercially available include Rhoplex™ 2438, Rhoplex™ SD-21, Lipocryl™ MB-3640, Rhoplex™ EC-2885, Rhoplex™ SD-51 (all manufactured by Rohm and Haas Company, Philadelphia, Pa.), and the like. Preferably, the latex binder is prepared by polymerizing one or more alkyl acrylates and/or alkyl methacrylates containing 1-18 carbons per alkyl group. Suitable monomers include, for example, methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate, behenyl methacrylate, and the like. "Alkyl", as used herein includes straight chain, branched and cyclic alkyl groups.

In one embodiment of the invention, the (meth)acrylic monomer is co-polymerized with at least one different monomer. By (meth)acrylic is meant herein an acrylic monomer or methacrylic monomer, or combination thereof. Suitable co-monomers include, for example, α, β olefinically unsaturated carboxylic acids containing 3-5 carbons, and esters thereof containing 4-20 carbons; mono-unsaturated dicarboxylic acids containing 4-8 carbons; nitriles selected from α, β olefinically unsaturated nitriles containing 3-5 carbons; polymerizable ethylenically unsaturated mono- and di-carboxylic acids containing 3-8 carbons, and esters thereof containing 4-20 carbons; vinyl esters of carboxylic acids containing 4-22 carbons; a olefins containing 2-12 carbons; styrene and styrene derivatives; and other polyfunctional monomers. Preferred co-monomers include styrene, acrylonitrile, acrylic acid, acrylamide, methacrylamide, N-methylol (meth)acrylamide, and itaconic acid.

In one embodiment of the invention, the latex binder is a thermoplastic elastomer.

In the preferred embodiment, the foamable sealant formulation contains a latex binder which is substantially free from chlorine. "Substantially free" means that no more than 1 wt %, preferably no more than 0.5 wt %, more preferably no more than 0.1 wt % of the binder is a chlorine.

The latex binder is formed by emulsion polymerization according to various procedures known in the art, including, without limitation, those described in, U.S. Pat. Nos. 4,524,093, 4,814,373, and European Patent No. EP0623659. The emulsion polymerization process may involve the use of one or more polymer stages, whereby a first stage forms a core stage polymer, and at least one second stage forms a shell around the core stage polymer. Additional polymer stages may be subsequently polymerized around the shell stage polymer, forming additional shell stage polymers. In the preferred embodiment, the toughness of the binder polymer is enhanced by methods known in the art, such as, for example pre-crosslinking the latex binder, reacting the latex binder with a crosslinking agent, using a self-crosslinking binder polymer, and the like.

In one embodiment of the invention, the latex binder is pre-crosslinked with a multi-functional monomer. By "multifunctional" is meant herein, a monomer having multiple sites available for polymerization. Examples of suitable multifunctional monomers include, for example, allyl methacrylate, butylene glycol dimethacrylate, trimethylolpropane trimethacrylate, and the like.

In one embodiment of the invention, the latex binder polymer is prepared such that it is self-crosslinking. "Self-crosslinking" means that the latex polymer can cure upon exposure to the cure temperature, for a sufficient period of time, without requiring the addition of a significant amount of a crosslinking agent. The curing time and temperature will depend upon the latex binder used. Curing may occur during one or more cycles, with each cycle having the same, or different duration and/or temperature, and may be influenced by the duration and temperature of the curing cycles for the automotive paint on the vehicle. Typical curing profiles include, for example at least one cycle of 15 to 30 minutes each, at 140° C. to 165° C. In those embodiments of the invention where the latex binder is self-crosslinking, the acrylic monomer is co-polymerized with a self-curing monomer, such as, for example, acrylamides derived from acrylic and methacrylic acids, and their N-alkylol or N-alkoxyalkyl derivatives containing 3-12 carbons; N-methylol acrylamide; N-substituted or other substituted amides; acetoacetoxyethyl methacrylate; epoxidized acrylates, such as glycidal methacrylate; hydroxy ethyl (meth)acrylate; methacrylic acid, and the like. By "(meth)acrylate" is meant herein an acrylate or methacrylate, or combination thereof.

In an alternative embodiment of the invention, a crosslinking agent may be used to react with the latex binder. In this embodiment of the invention, the latex binder polymer bears a functional moiety that may react with the crosslinking agent to achieve a cured binder. Suitable moieties include those that are able to react with the crosslinking agent, for example, hydroxyl, carboxyl, acetoacetoxyethyl methacrylate functional moieties, and the like. Suitable crosslinking agents are those that are able to react with the latex polymer functional moieties, causing curing of the latex binder, including, for example, resins containing melamine/formaldehyde resins, epoxy resins, amines, isocyanates, and the like. Those skilled in the art know which crosslinking agents are more suitable for use with the various types of functional moiety.

The latex binder has a glass transition temperature (Tg) of from −35° C. to 35° C., as calculated using the Fox equation (1) (T.G. Fox, Bull. Am. Physics Soc., Volume 1, Issue No. 3, page 123 (1956)). That is, for calculating the Tg of a copolymer of monomers M1 and M2, $$1/Tg(\text{calc.}) = w(M1)/Tg(M1) + w(M2)/Tg(M2) \qquad (1)$$

wherein

Tg(calc.) is the glass transition temperature calculated for the copolymer;

w(M1) is the weight fraction of monomer M1 in the copolymer;

w(M2) is the weight fraction of monomer M2 in the copolymer;

Tg(M1) is the glass transition temperature of the homopolymer of M1; and

Tg(M2) is the glass transition temperature of the homopolymer of M2, with all temperatures being measured in ° K.

Latex binders having a Tg of from −60° C. to 60° C. may be suitable for use in foamable sealant compositions. However, use of a single latex binder having a Tg within this range suffers from limitations with regard to performance at varying use temperatures. Thus, it is preferred to us blends of latex binders, each having a different Tg. Use of such blends is beneficial, particularly where the manufacturer of motor vehicles containing the foamable sealant formulation sells the vehicles in a geographical region where the motor vehicle will be exposed to wide temperature ranges, or in multiple geographical regions each having significantly different temperature patterns. In one embodiment of the invention, the latex binder having a Tg of from −35° C. to 35° C. is mixed with at least one second latex binder. The second latex binder may be a low Tg binder, having a Tg in the range of from −60° C. to 0C, preferably from −40° C. to 0° C., and more preferably from −40° C. to −20° C. Alternatively, the second latex binder may be a high Tg binder, having a Tg in the range of from 0° C. to 60° C., preferably from 20° C. to 50° C., more preferably from 30° C. to 40° C. The latex binder having a Tg of from −35° C. to 35° C. may be mixed with both a low Tg latex binder and a high Tg latex binder.

Where the foamable sealant formulation is to be used for acoustical purposes, the blend of the latex binder with a low Tg latex binder enables acoustical performance at low temperatures, such as −20° C. to 0° C., while the blend of the latex binder with a high Tg latex binder enables acoustical performance at high temperatures, such as 20° C. to 40° C. Relative proportions of the blended latex binders will depend upon the desired performance characteristics. Preferably at least 50 wt % of the blend, based on the total weight of the blend, is the latex binder having a Tg of from −35° C. to 35° C.

The foamable sealant formulation may be foamed to form a sealant, useful, for example, in motor vehicles. The foamed sealant has a foam density of from 0.4 to 1.8 g/cc, preferably from 0.6 to 1.5 g/cc, more preferably from 0.8 to 1.2 g/cc. This high foam density enables the achievement of higher tensile strength, after drying, and/or curing, than is achievable by foams having a lower density, such as those typically used for textile applications, where foam densities are typically from about 0.1 to 0.3 g/cc. The foamed sealant of the invention is preferably a stand-up foam, meaning that it is used in a form which is substantially uncrushed. In the case of foamed acrylic resins for textiles, the processing of the textile typically includes crushing of the applied foam, followed by curing. The integration of high levels of air in the foamable compositions for textiles results in a dried foam having a lower tensile strength, which, among other things, facilitates crushing of the foam. In one embodiment of the invention, the foamed and cured sealant formulation has an elongation at break of at least 50%, preferably at least 75%, more preferably at least 85%. In another embodiment of the invention, the foamed and cured sealant formulation has an elongation at maximum tensile of at least 50%, preferably at least 75%, more preferably at least 85%.

In addition to the latex binder, the foamable sealant formulation contains at least one foam-generating composition. The foam-generating composition may be a profoamant surfactant. By "profoamant" is meant herein a surface active agent that aids in the formation of foam bubbles. In the preferred embodiment, the profoamant surfactant is an anionic or nonionic surfactant having a hydrophilic- lipophilic balance (HLB) of from 8 to 20, preferably from 10 to 18, more preferably from 12 to 16. The term "hydrophilic-lipophilic balance" is well known to those skilled in the art, and represents an empirical expression of the relationship of the hydrophilic and hydrophobic groups of a surfactant. It is based on an empirical scale from about 1 to 20. Surfactants with a low HLB number (<10) have limited solubility in water. Those with a high HLB value (>10) are soluble, and good dispersants, in water. Preferred profoamant surfactants aid in the formation of small, uniform bubbles. The profoamant surfactant is preferably used in amounts of from 0.5 wt % to 5 wt %, based on dry weight of the latex binder. Suitable profoamant surfactants are known in the art, and include, for example, salts of aliphatic or alkylaryl sulfonic acid, for example, sodium lauryl sulfate or sodium dodecyl benzene sulfonate; and nonionic surfactants such as polyethylene oxide condensates of fatty alcohols.

Alternatively, the foam-generating composition may be a blowing agent. By "blowing agent" is meant herein a substance that is incorporated into a mixture for the purpose of producing a foam. Suitable blowing agents include, for example, chemical blowing agents, such as azidoformate, sodium bicarbonate, p-toluene sulfonyl hydrazide, azodicarbonamide, and the like; and expandable microspheres such as Expancel™ microspheres (manufactured by Akzo Nobel, Sundsvall, Sweden).

The foamable sealant formulation further contains a foam stabilizer. By "stabilizer" is meant herein a compound that at least partially inhibits the collapse of the bubbles in the foam. Preferred surfactants are those bearing at least one long chain aliphatic group. The stabilizer is preferably used in amounts of from 1 wt % to 10 wt % based on dry weight of the latex binder. Suitable stabilizing compounds are known in the art, and include, for example, salts of 18 carbon aliphatic acids or mixtures of aliphatic carboxylic acids of from about 16-20 carbons, particularly where the acid is saturated, for example NH4, Na, K stearate; and salts of 12-24 carbon fatty acids, such as oleic acid, tallow fatty acids, tall oil fatty acids, and the like.

Additonally, the foamable sealant formulation contains a rheology modifier. By "rheology modifier" is meant herein a material that is useful for obtaining the degree of viscosity required for proper foam stabilization, and application of the foamed sealant. Preferably, the rheology modifier assists in the formation of a fine, uniform, stable foam. The rheology modifier is preferably used in amounts of from 0.5 wt % to 10 wt %, based on dry weight of the latex binder. Suitable rheology modifiers include, for example, hydroxyethyl cellulose; alkali swellable rheology modifiers such as Acrysol™ ASE-60, Acrysol™ ASE-95P (both manufactured by Rohm and Haas Company, located in Philadelphia, Pa.); hydrophobically modified alkali swellable thickeners such as Acrysol™ TT-615 (manufactured by Rohm and Haas Company, located in Philadelphia, Pa.); hydrophobically modified ethylene oxide urethanes such as Acrysol™ RM-12W (manufactured by Rohm and Haas Company, located in Philadelphia, Pa.), and the like, and combinations thereof.

The solids content of the foamable sealant formulation is preferably from 50 wt % to 80 wt %, based on the weight of the total sealant formulation. The remaining non-solids are primarily water.

Optionally, the foamable sealant formulation may contain an extender and/or other pigment. By "extender" is meant herein a material that may be used to substitute higher cost components of the foamable formulation, and whose presence does not compromise foam formation, or otherwise detract from the performance of the foamable sealant. Suitable extenders include, for example, clay, mica, talc, silica, aluminum hydrates, and the like.

It is desirable that the applied, dried sealant be tough, durable, flexible, and able to recover its form upon deformation caused, for example, by application of pressure. At least one of these properties may be imparted to the foamable sealant formulation by use of a curing agent, as described herein-above, polyurethane dispersion, functional silicone in solution, plasticizer, and the like, or a combination thereof. Curing agents useful for imparting at least one of toughness, durability, or deformation recovery, include, for example, melamine/formaldehyde resin with or without catalyst, for example Cymel™ 303/pTSA (manufactured by Cytek Industries, located in Stanford, Conn.); epoxy resins, water dispersed isocyanates, and the like. Polyurethane dispersions suitable for imparting at least one of toughness and flexibility include, for example Sancure™ 2026 (manufactured by Noveon, located in Brecksville, Ohio). Aqueous solutions of functional silicone, such as, for example, Silicone Solution™ CT 101 (manufactured by Wacker, located in Adrian, Mich.), are useful for promotion of foam rebound. Plasticizers, such as, for example, Santicizer™ 261 (manufactured by Monsanto, located in St. Louis, Mo.), are useful for imparting at least one of flexibility or low temperature performance.

The foamable sealant formulation may be foamed by the introduction of entrapped gas cells either mechanically, or chemically. Mechanical introduction of the gas cells is preferred. Conventional methods for foaming of binder materials are well known. A typical mechanical foaming method is to inject bubbles of a gas, such as air, nitrogen or carbon dioxide, and the like, or a mixture thereof, into a foamable formulation located in the mixing head of a mechanical foamer, causing the formation of a coarse froth in the mixing head. Optionally, the foamable formulation may be warmed to a temperature of from about 35° C. to about 38 ° C. prior to introduction into the mixing head, to promote better foam generation. The froth is preferably refined, using high shear, to yield a smooth, fine, homogeneous foam of bubbles that are substantially uniform in size. The foam may be pumped out of the mixing head, for example, through a hose, and into an applicator, such as an extrusion coater. The pump speed, gas pressure, gas flow rate, and speed of the rotor in the foaming head, may be controlled to produce the desired foam density. The gas pressure pushing gas into the latex should exceed the back pressure, preferably, by at least 1 kg/cm2. The pressure differential is influenced by the sealant formulation viscosity, gas feed rate, and length and diameter of the foam delivery hose, among other things.

Alternatively, the foam may be generated chemically, for example by mixing the foamable formulation ingredients with a blowing agent. Chemical blowing agents, such as, for example, azidoformate, sodium bicarbonate, p-toluene sulfonyl hydrazide, azodicarbonamide, and the like, may be added to the foamable formulation, and then heated to a temperature sufficient to cause the release of a gas, such as nitrogen, or carbon dioxide from the blowing agent. The heating is typically conducted in an enclosed chamber, in which the bubble expansion can be controlled to prevent the bubbles from collapsing. Other blowing agents may be used, such as, for example expandable microspheres such as Expancel™ microspheres (manufactured by Akzo Nobel, located in Sundsvall, Sweden). The Expancel™ microspheres contain a gas encapsulated by a thermoplastic polymer shell. The microspheres may be added to the foamable formulation and then heated. Heating of the gas inside the shell causes an increase in the gas pressure, and softening of the thermoplastic shell, resulting in a significant increase in the volume of the microspheres. The blowing agents may be used alone, in combination with each other, and/or in combination with mechanical foaming. In those embodiments of the invention in which blowing agents are used, it is not necessary to include the profoamant surfactant in the foamable formulation.

The foamed sealant formulation may be applied to a substrate by conventional means for applying foams, and then cured. Preferably, the foamed sealant formulation is able to adhere to automotive vehicle substrates such as, for example, metal including electrodeposition-coated metal, galvanized steel, plastic, other hard non-porous substrates, and the like. In one embodiment of the invention, the foamed sealant formulation has a 180 degree peel bond to at least one of metal, or nonporous surfaces to which sealants and liquid applied sound deadening coatings are typically applied, of at least 1 in-lb, preferably at least 3 in-lb, more preferably at least 5 in-lb.

In one embodiment of the invention, the dried and cured foamable sealant formulation is useful for sound deadening. Preferably, the latex binder alone, or in the sealant formulation, has sound deadening capability, such that the dynamical mechanical analysis mastercurve of the latex polymer yields a maximum tan delta of at least 1.5, within the frequency range of from 0.0001 to 10,000 Hz at 20° C. to 25° C.

The following examples are presented to illustrate the invention.

Foamable Sealant Formulation and Foaming

EXAMPLES 1-3

Foamable sealant formulations were prepared by mixing the ingredients in Tables 1-3. Each sealant formulation was foamed briefly in Kitchen Aid-type mixer, on high speed, to incorporate air to a density of 0.6 to 0.9 g/cm2. The foam was then refined briefly on slow speed. The appearance of the foam was smooth and homogenous. The foam was applied to a non-porous substrate, dried, and cured.

TABLE 1

| Example 1 Ingredients | Amount (g) | Function | Manufacturer |
|---|---|---|---|
| Latex M (Tg −20° C.) | 154.5 | Self-curing binder | Rohm and Haas (Philadelphia, Pennsylvania) |
| GK 1201 Clay Slurry (68%) | 61.8 | Extender | Georgia Kaolin (Union, New Jersey) |
| Water | 16.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Stanfax ™ 320 | 9.0 | Foam stabilizer | ParaChem (Spartanburg, South Carolina) |

TABLE 2

| Example 2 Ingredients | Amount (g) | Function | Manufacturer |
|---|---|---|---|
| Latex M (Tg −20° C.) | 154.5 | Self-curing binder | Rohm and Haas (Philadelphia, Pennsylvania) |
| GK 1201 Clay Slurry (68%) | 61.8 | Extender | Georgia Kaolin (Union, New Jersey) |
| Water | 16.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Cymel ™ 303 LF | 3.0 | Curing agent | (Stamford, Connecticut) |
| Stanfax ™ 320 | 9.0 | Foam stabilizer | ParaChem (Spartanburg, South Carolina) |
| Ammonium chloride (25%) | 3.0 | Catalyst | Fisher Scientific (Hampton, New Hampshire) |

TABLE 3

| Example 3 Ingredients | Amount (g) | Function | Manufacturer |
|---|---|---|---|
| Latex M (Tg −20° C.) | 154.5 | Self-curing binder | Rohm and Haas (Philadelphia, Pennsylvania) |
| GK 1201 Clay Slurry (68%) | 61.8 | Extender | Georgia Kaolin (Union, New Jersey) |
| Water | 16.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Silicone Solution ™ CT-101 | 1.5 | Foam rebound | Wacker (Adrian, Michigan) |
| Cymel ™ 303 LF | 3.0 | Curing agent | Cytec Industries (Stamford, Connecticut) |

TABLE 3-continued

| Example 3 Ingredients | Amount (g) | Function | Manufacturer |
|---|---|---|---|
| Stanfax ™ 320 | 9.0 | Foam stabilizer | ParaChem (Spartanburg, South Carolina) |
| Ammonium chloride (25%) | 3.0 | Catalyst | Fisher Scientific (Hampton, New Hampshire) |

EXAMPLES 4-6

Foamable sealant formulations were prepared by mixing the ingredients in Table 4. Each sealant formulation was foamed briefly in KitchenAid-type mixer, on high speed. The foam was then refined briefly on slow speed. The properties of the foam were as described in Table 4.

TABLE 4

| Ingredients | Comp. Ex. 4 (g) | Ex. 5 (g) | Ex. 6 (g) | Function | Source |
|---|---|---|---|---|---|
| Water | 66.2 | 36.8 | 36.8 | Diluent | |
| Latex A (Tg 8° C.) | 315.1 | | | Self-curing binder | Rohm and Haas (Philadelphia, Pennsylvania) |
| Latex B (Tg −6° C.) | | 355.4 | 177.6 | Self-curing binder | Rohm and Haas (Philadelphia, Pennsylvania) |
| Latex C (Tg 12° C.) | | | 190.9 | Self-curing binder | Rohm and Haas (Philadelphia, Pennsylvania) |
| Hydroglos ™ 91 Clay Slurry (68%) | 128.1 | 142.1 | 142.1 | Extender | J. M. Huber (Havre Grace, Maryland) |
| TiPure ™ R940 | 25.6 | | | | DuPont (Wilmington, Delaware) |
| Acrysol ™ ASE-95P | 0.55 | 0.69 | 0.69 | Rheology modifier | Rohm and Haas (Philadelphia, Pennsylvania) |
| Stanfax ™ 318 | 4.4 | 5.8 | 5.8 | Anionic profoamant surfactant | ParaChem (Spartanburg, South Carolina) |
| Silicone Solution ™ CT101 | | 3.5 | 3.5 | Foam rebound | Wacker (Adrian, Michigan) |
| Stanfax ™ 320 | 34.7 | 20.7 | 20.7 | Foam stabilizer | ParaChem (Spartanburg, South Carolina) |
| Cymel ™ 303 LF | 5.96 | 6.9 | 6.9 | Curing agent | Cytec Industries (Stamford, Connecticut) |
| Ammonium chloride (25%) | 6.1 | 6.9 | 6.9 | Catalyst | Fisher Scientific (Hampton, New Hampshire) |
| TOTAL | 586.7 | 578.8 | 591.9 | | |
| LVF Brookfield Viscosity (cP) | 8500 | 6400 | 6000 | | |
| pH | 9.52 | 9.49 | 9.47 | | |
| Foam Density (g/cc) | 0.2 | 0.8 | 0.8 | | |

EXAMPLES 7-10

Foamable sealant formulations are prepared by mixing the ingredients in Tables 5-10. Each sealant formulation is foamed briefly in Kitchen Aid-type mixer, on high speed, to incorporate air to a density of 0.6 to 0.9 g/cm2. The foam is then refined briefly on slow speed. The appearance of the foam is smooth and homogenous. The foam is applied to a non-porous substrate, dried, and cured.

TABLE 5

| Example 7 Ingredients | Amount (g) | Function | Source |
|---|---|---|---|
| Latex C (Tg 12° C.) | 166.0 | Self-curing binder | Rohm and Haas (Philadelphia, Pennsylvania) |
| GK 1201 Clay Slurry (68%) | 61.8 | Extender | Georgia Kaolin (Union, New Jersey) |
| Water | 5.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Santicizer ™ 261 | 2.3 | Plasticizer | Monsanto (St. Louis, Missouri) |
| Cymel ™ 303 LF | 3.0 | Curing agent | Cytec Industries (Stamford, Connecticut) |

TABLE 5-continued

| Example 7 Ingredients | Amount (g) | Function | Source |
|---|---|---|---|
| Stanfax ™ 320 | 9.0 | Foam stabilizer | ParaChem (Spartanburg, South Carolina) |
| Ammonium chloride (25%) | 3.0 | Catalyst | Fisher Scientific (Hampton, New Hampshire) |

TABLE 6

| Example 8 Ingredients | Amount (g) | Function | Source |
|---|---|---|---|
| Latex P (Tg 15° C.) | 167.7 | Binder | Rohm and Haas (Philadelphia, Pennsylvania) |
| GK 1201 Clay Slurry (68%) | 61.8 | Extender | Georgia Kaolin (Union, New Jersey) |
| Water | 4.0 | Diluent | |
| Triton ™ X-405 | 1.7 | Nonionic profoamant surfactant | Dow Chemical (Midland, Michigan) |
| Acrysol ™ TT-935 | 1.0 | Rheology modifier | Rohm and Haas (Philadelphia, Pennsylvania) |
| Cymel ™ 303 LF | 3.0 | Curing agent | Cytec Industries (Stamford, Connecticut) |
| Stanfax ™ 320 | 9.0 | Foam stabilizer | ParaChem (Spartanburg, South Carolina) |
| Catalyst 4040 | 1.9 | Catalyst | Cytec Industries (Stamford, Connecticut) |

TABLE 7

| Example 9 Ingredients | Amount (g) | Function | Source |
|---|---|---|---|
| Latex C (Tg 12° C.) | 83.0 | Acrylic binder 1 | Rohm and Haas (Philadelphia, Pennsylvania) |
| Latex M (Tg −20° C.) | 38.6 | Acrylic binder 2 | Rohm and Haas (Philadelphia, Pennsylvania) |
| Latex T (Tg 35° C.) | 41.5 | Acrylic binder 3 | Rohm and Haas (Philadelphia, Pennsylvania) |
| GK 1201 Clay Slurry (68%) | 61.8 | Extender | Georgia Kaolin (Union, New Jersey) |
| Water | 8.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Cymel ™ 303 LF | 3.0 | Curing agent | Cytec Industries (Stamford, Connecticut) |
| Stanfax ™ 320 | 9.0 | Foam stabilizer | ParaChem (Spartanburg, South Carolina) |
| Ammonium chloride (25%) | 3.0 | Catalyst | Fisher Scientific (Hampton, New Hampshire) |

TABLE 8

| Example 10 Ingredients | Amount | Function | Source |
|---|---|---|---|
| Latex W (Tg 8° C.) | 117.0 | Acrylic binder | Rohm and Haas (Philadelphia, Pennsylvania) |
| Sancure ™ 2026 | 48.8 | Polyurethane dispersion | Noveon (Brecksville, Ohio) |
| GK 1201 Clay Slurry (68%) | 30.9 | Extender 1 | Georgia Kaolin (Union, New Jersey) |
| Beaverwhite ™ 325 (68%) | 30.9 | Extender 2 | Cyprus Minerals (Englewood, Colorado) |
| Water | 5.0 | Diluent | |
| Stanfax ™ 318 | 2.5 | Anionic profoamant surfactant | ParaChem (Spartanburg, South Carolina) |
| Acrysol ™ ASE-95NP | 1.8 | Rheology modifier | Rohm and Haas (Philadelphia, Pennsylvania) |
| Cymel ™ 303 LF | 3.0 | Curing agent | Cytec Industries (Stamford, Connecticut) |
| Stanfax ™ 320 | 9.0 | Foam stabilizer | ParaChem (Spartanburg, South Carolina) |
| Ammonium chloride (25%) | 3.0 | Catalyst | Fisher Scientific (Hampton, New Hampshire) |

EXAMPLE 11

Application and Tensile Testing of the Foamed Sealant

Soon After the Foaming Process, a Portion of the Foam was Applied to Silicone Release Paper for Tensile Testing.

Preparation of Test Specimens

First, uniform free films of the foam were prepared according to a modified ASTM D 4708-99 Method (Standard Practice for Preparation of Uniform Free Films of Organic Coatings), as follows. A smooth, flat surface was covered with a sheet of a silicone coated release paper having a thickness of 5 mil. Then, a film of the foam was applied to the sheet of silicone coated paper using a 75 mil drawbar, using a 1 inch gap, a 1 inch per minute crosshead speed, and a ½ inch wide rectangular specimen. The applied films had a thickness of 50 mils±10%, as measured by a Micrometer Film Thickness Gage, according to Procedure A of ASTM Test Method D1005 (Standard Test for Measurement of Dry-Film Thickness of Organic Coatings Using Micrometers). The applied films were dried for 10 minutes at ambient temperature, 15 minutes at 80° C. and 30 minutes at 150° C.

Tensile Testing of Foam

Tensile testing was performed according to a modified ASTM D2370-98 (Standard Test Method for Tensile Properties of Organic Coatings) as follows:

The load weighing and recording system of a tensile tester was balanced, zeroed, and calibrated in accordance with the methods specified by the manufacturer. The tensile tester was of the constant rate of jaw separation type, equipped with load cells having capacities of 100 to 2000 g, and equipped with an indicating device.

Four test specimens, each exhibiting no nicks or flaws, were conditioned for at least 24 hours under ambient conditions, and were tested at 23±2° C. and 50% relative humidity. A gage length of 25 mm was selected. The thickness of each specimen was measured to ±0.1 mil with a micrometer in accordance with Procedure A of ASTM Test Method D1005, taking 2 to 3 measurements within the gage length area.

The jaw separation of the tensile tester was set at the selected gage length. The test specimens were placed in the grips of the testing machine, taking care to align the long axis of the specimen with an imaginary line joining the points of attachment of the grips to the machine. The grips were tightened evenly and firmly to the degree necessary to minimize slipping of the specimen during test. The crosshead speed of the tensile tester was set to provide a rate of elongation (strain rate) of 100%/min for the selected gage length.

A test specimen was selected, and elongated until rupture of the film. The stress-strain curve was evaluated as follows:

The specimen elongation was determined by measuring the increase in jaw separation from the point of original load application to the point of rupture. The tensile pull, in pounds per square inch, required to rupture the film was measured. The tensile pull in pounds to elongate the film 1% from the first point in the stress-strain curve where the slope becomes constant, was determined. Testing was repeated for the remaining three test specimens.

For each specimen, the elongation (E), tensile strength (TS), and stiffness (modulus of elasticity, (S)), were calculated according to Equations (1), (2) and (3), respectively, of ASTM Method D 2370. The uniformity of the tensile strength and elongation results obtained for the four specimens were examined. No spurious values were detected, therefore the results of all four tests were averaged. The results of the testing are as described in Table 9.

TABLE 9

| Foamed Sealant | Foam Density (g/cc) | Thickness (mils) | Elongation at Max. Tensile (%) | Elongation at Break (%) | Maximum Tensile (psi) | Break Tensile (psi) |
|---|---|---|---|---|---|---|
| Comp. Ex. 4 | 0.2 | 48 | 24 | 24 | 6.2 | 0.03 |
| Ex. 5 | 0.8 | 51 | 92 | 95 | 150 | 84 |
| Ex. 6 | 0.8 | 47 | 94 | 99 | 196 | 103 |

EXAMPLE 12

Application and Adhesion Testing of the Foamed Sealant

Adhesion testing was performed according to a modified ASTM C 794-01 (Standard Test Method for Adhesion-in-Peel of Elastomeric Joint Sealants) (hereinafter the "180° peel bond to metal" test) as follows: Four test specimens were prepared using the following procedures:

The test surface, an electrodeposition coated metal panel (a phosphate treated cold rolled steel coated with a primer by cathodic electrodeposition) was cleaned using isopropanol, followed by a thorough cleaning with a detergent solution, a final rinse with distilled water, and air drying.

Foamed sealants were prepared as described in Comparative Example 4, and Examples 5-6. Soon after the foaming process, a portion of the foam was applied to the clean, dry electrodeposition-coated metal panel using a 35 mil draw bar. A strip of Airplane Cloth (Grade-A, desized, 4.28 oz/yd, 80/84 count, 6 pieces at least 178 mm long and 76 mm wide) was laid over the layer of foamed sealant. The cloth was lightly pressed into the foamed sealant using the straight edge of a draw bar, until the foamed sealant had thoroughly penetrated the cloth. A second layer of foamed sealant was then applied using a 40 mil draw bar. The specimens containing the foamed sealant were dried and/or cured by subjecting to room temperature for 10 minutes, 80 ° C. for 15 minutes, and 150° C. for 30 minutes.

Immediately following the full drying and/or curing period, four cuts were made with a sharp blade lengthwise of the specimen, cutting completely through to the substrate surface. Excess material was removed, so as to leave two 25.4 mm wide strips of cloth-covered sealant, separated by a space about 9.5 mm wide. Caution was taken in removing the escess material so that the sealant/substrate bind in the test strips was not disturbed. The specimens were placed in a testing machine, a machine having tension grips capable of pulling at a rate of separation of 51 mm/min, and having a chart indicator calibrated in 0.45 kg units. Using the testing machine, the cloth was peeled back at an angle of 180°, at a rate of separation of 50.8 mm/min. The specimen was peeled for about 1 minute, and the average force in in-lb, indicated by the testing machine, was recorded. Testing was done in quadruplicate. None of the four cloths peeled clean from the sealant, therefore, none of the results were discarded. The results of all four tests were averaged, and are described in Table 10.

TABLE 10

| Foamed Sealant | Foam Density (g/cc) | 180° Peel Adhesion (in-lb) |
|---|---|---|
| Comp Ex. 4 | 0.2 | 0.12 |
| Ex. 5 | 0.8 | 1.72 |
| Ex. 6 | 0.8 | 5.42 |

I claim:

1. A foamed coating composition comprising:
   (a) a latex binder composition comprising, as polymerized units at least one acrylic or methacrylic monomer, wherein said binder has a Tg from −35 to 35° C.;
   (b) a foam-generating composition selected from the group consisting of a profoamant surfactant comprising an anionic or nonionic surfactant having a hydrophilic-lipophilic balance of from 8 to 20, and a blowing agent;
   (c) a foam stabilizer,
   (d) a rheology modifier;
   (e) water;
   wherein the composition, has a density of from 0.4 to 1.8 g/cc.

2. The composition of claim 1 wherein said composition, when cured, has a 180 degree peel bond to metal of at least 1 in-lb.

3. The composition of claim 1 wherein said composition, when cured, has an elongation at break of at least 50%.

4. The composition of claim 1 wherein said composition further comprises at least one crosslinking agent.

5. The composition of claim 1 wherein said latex binder is self-crosslinking.

6. The composition of claim 1 wherein said latex binder is pre-crosslinked, during polymerization, with at least one multifunctional monomer.

7. The composition of claim 1 wherein said latex binder is substantially free of chlorine.

8. The composition of claim 1 wherein said composition further contains at least one low Tg acrylic latex binder, having a Tg of from −60° C. to 0° C.

9. The composition of claim 8 wherein said composition further contains at least one high Tg acrylic latex binder, having a Tg of from 0° C. to 60° C.

10. The composition of claim 1 wherein said composition further contains at least'one high Tg acrylic latex binder, having a Tg of from 0° C. to 60° C.

11. The composition of claim 1 wherein said composition is foamed by mechanical or chemical means.

12. A method of sealing a vehicle, comprising the steps of:
   i. providing a foamable position comprising:
      (a) a latex birder composition comprising, as polymerized units at least one acrylic or methacrylic monomer, wherein said binder has a Tg from −35 to 35 ° C.;
      (b) a foam-generating composition selected from the group consisting of profoamant surfactant comprising an anionic or nonionic surfactant having a hydrophilic-lipophilic balance of from 8 to 20, and a blowing agent;
(c) a foam stabilizer;
(d) a rheology modifier, and
(e) water;

ii. foaming said composition to a density of from 0.4 to 1.8g/cc to form a foamed sealant;
iii. applying said foamed sealant to a motor vehicle; and
iv. curing said foamed sealant.

* * * * *